United States Patent
Spivak et al.

(10) Patent No.: US 11,816,827 B2
(45) Date of Patent: Nov. 14, 2023

(54) USER INTERFACE DEVICE FOR AUTONOMOUS MACHINE VISION INSPECTION

(71) Applicant: INSPEKTO A.M.V. LTD., Ramat Gan (IL)

(72) Inventors: Alexander Spivak, Hadera (IL); Yonatan Hyatt, Tel-Aviv (IL); Sivan Mottes, Pardes Hana Karkur (IL)

(73) Assignee: INSPEKTO A.M.V. LTD., Ramat Gan (IL)

( * ) Notice: Subject to any disclaimer, the term of this patent is extended or adjusted under 35 U.S.C. 154(b) by 0 days.

(21) Appl. No.: 17/798,901

(22) PCT Filed: Feb. 14, 2021

(86) PCT No.: PCT/IL2021/050174
§ 371 (c)(1),
(2) Date: Aug. 11, 2022

(87) PCT Pub. No.: WO2021/161321
PCT Pub. Date: Aug. 19, 2021

(65) Prior Publication Data
US 2023/0128214 A1     Apr. 27, 2023

Related U.S. Application Data

(60) Provisional application No. 62/975,877, filed on Feb. 13, 2020.

(30) Foreign Application Priority Data

Feb. 13, 2020   (IL) ............................. 272752

(51) Int. Cl.
*G06T 7/60* (2017.01)
*G06T 7/00* (2017.01)
(Continued)

(52) U.S. Cl.
CPC ....... *G06T 7/0004* (2013.01); *G01N 21/8851* (2013.01); *G06F 3/04817* (2013.01);
(Continued)

(58) Field of Classification Search
CPC ......... G06T 7/0004; G06T 7/60; G06T 11/00; G06T 2200/24; G01N 21/8851;
(Continued)

(56) References Cited

U.S. PATENT DOCUMENTS 6,330,354 B1   12/2001   Companion et al.
9,224,070 B1   12/2015   Sundareswara et al.
(Continued)

FOREIGN PATENT DOCUMENTS

EP      2801815 A1        11/2014
JP      2005208890 A      8/2005
(Continued)

OTHER PUBLICATIONS

Islam et al., "Enhanced Automatic Surface and Structural Flaw Inspection and Categorization Using Image Processing Both for Flat and Textured Ceramic Tiles", International Journal of Computer Applications, Jun. 2012, 48(3), pp. 1-10, Foundation of Computer Science, New York, NY, USA.
(Continued)

*Primary Examiner* — Sheela C Chawan
(74) *Attorney, Agent, or Firm* — ALPHAPATENT ASSOCIATES, LTD; Daniel J. Swirsky

(57) ABSTRACT

A system for visual inspection, which includes a processor that receives a sensitivity level relating to an image of an item on an inspection line, the image being displayed on the user interface device, and calculates a minimal defect size visible in the image at the received sensitivity level. The calculated minimal defect size is then displayed on a user interface. This visual demonstration of minimal detectable
(Continued)

size, which changes as the user changes sensitivity level, enables the user to easily obtain a desired minimal detectable defect size.

20 Claims, 9 Drawing Sheets

(51) Int. Cl.
  *G01N 21/88* (2006.01)
  *G06F 3/04817* (2022.01)
  *G06F 3/04845* (2022.01)
  *G06F 3/04847* (2022.01)
  *G06T 11/00* (2006.01)

(52) U.S. Cl.
  CPC ...... *G06F 3/04845* (2013.01); *G06F 3/04847* (2013.01); *G06T 7/60* (2013.01); *G06T 11/00* (2013.01); *G01N 2021/8887* (2013.01); *G06F 2203/04806* (2013.01); *G06T 2200/24* (2013.01)

(58) Field of Classification Search
  CPC ........ G01N 2021/8887; G06F 3/04817; G06F 3/04845; G06F 3/04847; G06F 2203/04806
  USPC .................................................. 382/100, 149
  See application file for complete search history.

(56) References Cited

U.S. PATENT DOCUMENTS

| | | | |
|---|---|---|---|
| 9,330,339 B2 | 5/2016 | Hofman | |
| 9,729,824 B2 | 8/2017 | Cutler et al. | |
| 9,886,771 B1* | 2/2018 | Chen | G06F 3/04845 |
| 2003/0182251 A1 | 9/2003 | Kim et al. | |
| 2004/0008880 A1* | 1/2004 | Horie | G01N 21/95607 |
| | | | 382/145 |
| 2004/0218715 A1* | 11/2004 | Jones | G01N 33/2045 |
| | | | 378/57 |
| 2004/0228515 A1* | 11/2004 | Okabe | G06T 7/0004 |
| | | | 382/145 |
| 2005/0062960 A1 | 3/2005 | Tsuji et al. | |
| 2006/0102839 A1 | 5/2006 | Bhaskar et al. | |
| 2008/0181533 A1 | 7/2008 | Jung et al. | |
| 2008/0317329 A1* | 12/2008 | Shibuya | G06T 7/0004 |
| | | | 382/149 |
| 2009/0147317 A1 | 6/2009 | Kiplinger et al. | |
| 2010/0157044 A1 | 6/2010 | Mori et al. | |
| 2010/0215246 A1 | 8/2010 | Albeck et al. | |
| 2011/0107259 A1* | 5/2011 | Haugh | G06F 3/0482 |
| | | | 715/810 |
| 2012/0128230 A1 | 5/2012 | Meada et al. | |
| 2012/0144133 A1* | 6/2012 | Walter | G16H 10/60 |
| | | | 711/E12.001 |
| 2012/0154607 A1 | 6/2012 | Moed et al. | |
| 2012/0155741 A1 | 6/2012 | Shibuya et al. | |
| 2013/0161490 A1* | 6/2013 | Kawaguchi | H04N 25/711 |
| | | | 250/208.1 |
| 2013/0177232 A1 | 7/2013 | Hirano | |
| 2014/0310670 A1* | 10/2014 | Oberai | G06F 30/398 |
| | | | 716/112 |
| 2014/0314276 A1 | 10/2014 | Wexler et al. | |
| 2015/0064813 A1 | 3/2015 | Ayotte et al. | |
| 2015/0131116 A1 | 5/2015 | Sochi | |
| 2015/0221077 A1 | 8/2015 | Kawabata et al. | |
| 2017/0220241 A1* | 8/2017 | Vangapalli | G06F 3/041 |
| 2019/0114756 A1 | 4/2019 | Weiss et al. | |
| 2019/0170659 A1* | 6/2019 | Kaneko | G01N 21/8851 |
| 2019/0188846 A1 | 6/2019 | Tamai | |
| 2020/0160083 A1* | 5/2020 | Zhu | G06V 10/758 |

FOREIGN PATENT DOCUMENTS

| | | |
|---|---|---|
| KR | 101688458 B1 | 12/2016 |
| WO | WO 2020100146 A1 | 5/2020 |

OTHER PUBLICATIONS

Je-Kang Park et al., "Machine Learning-Based Imaging System for Surface Defect Inspection", International Journal of Precision Engineering and Manufacturing-Green Technology, Jul. 2016, vol. 3, No. 3, pp. 303-310, Springer, New York, NY, USA.

J. Iivarinen et al., "A defect detection scheme for web surface inspection" International Journal of pattern recognition and artificial intelligence (IJPRAI), Sep. 2000, pp. 735-754, vol. 14 No. 6, World Scientific Publishing Company, Singapore.

S. W. Kim et al., "A self-growing and self-organizing batch map with automatic stopping condition", 2013 5th International Conference on Knowledge and Smart Technology (KST), Jan. 31, 2013, pp. 21-26, IEEE, New York, USA.

Lorente et al. "Recent advances and applications of hyperspectral imaging for fruit and vegetable quality assessment". Food and Bioprocess Technology. May 2012, 5(4):1121-1142, Springer, New York, NY, USA.

* cited by examiner

USER INTERFACE DEVICE FOR AUTONOMOUS MACHINE VISION INSPECTION

FIELD

The present invention relates to visual inspection processes, for example, image based inspection of items on a production line.

BACKGROUND

Inspection during production processes helps control the quality of products by identifying defects and acting upon their detection, for example, by fixing them or discarding defected parts, and is thus useful in improving productivity, reducing defect rates, and reducing re-work and waste.

Automated visual inspection methods are used in production lines to identify visually detectable anomalies that may have a functional or esthetical impact on the integrity of a manufactured part. Existing visual inspection solutions for production lines on the market today are highly expensive as they rely on custom-made automated visual inspection systems, that require expert involvement in setting the surroundings, the camera apparatus and shooting parameters and software. Each such solution is typically limited to the specific defects and the specific imaging environment and arrangement of the camera apparatus for which the solution was set-up. In addition to requiring expert set up, these solutions also require expert maintenance throughout the life-time of the inspection solution and the production line.

In addition to the initial high cost of the system, each new manufactured article or new identified defect causes downtime that may be measured in months, between the time a project is initiated until it is deployed. In the interim period, a plant is compelled to use expensive internal/external human workforce to perform quality assurance (QA), gating, sorting or other tasks, or bear the risk and/or production degrade of not performing any of these at one or more parts of the plant production lines.

There is a growing inconsistency between industrial plants' need for agility and improvement, on one hand, and the expensive and expert based set up process of contemporary inspection solutions, on the other hand.

SUMMARY

Embodiments of the invention allow a user to easily control inspection performance and adjust the inspection process to specific needs, thereby providing an inspection solution which is adjustable and does not require expert involvement. Embodiments of the invention allow a non-expert user to easily visualize, in real-time, the effect of adjustments of the inspection process, thereby greatly facilitating the options of the user for tailoring the inspection process to specific needs.

In one embodiment a user interface device visually demonstrates to a user what the minimal detectable defect size is, for each set up aspect of the inspection system. For example, set up aspects can include the distance of the camera from an imaged item, the zoom level of the camera, optimal focus settings, etc. These aspects, among others, define the geometry of the inspection process, and allow conversion between pixel units and absolute measurement units, such as, metric units. As the minimal detectable defect size is mostly correlated to the visible size of the defect in pixels, a minimal detectable defect size can be demonstrated to a user, via a user interface device, for each distance of camera, zoom level of camera, optimal focus setting, etc. This visual demonstration of minimal detectable size, which changes as the user changes set up aspects, enables the user to easily obtain a desired minimal detectable defect size consistent with specific item or inspection needs.

Embodiments of the invention provide the user with an indication of the expected minimal detectable defect sizes, without the user having or needing knowledge of the camera optical parameters, the geometry of the inspection system and the internal algorithms detection capabilities.

A system that demonstrates to a user the effect of adjusting a set up aspect, on inspection performance, reduces user frustration, and provides a user experience of autonomous visual inspection, thereby enhancing the quality of user experience, and enables even a non-expert user to improve and adapt the inspection performance to the user or manufacturing plant's needs, in real-time.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Figure 1:
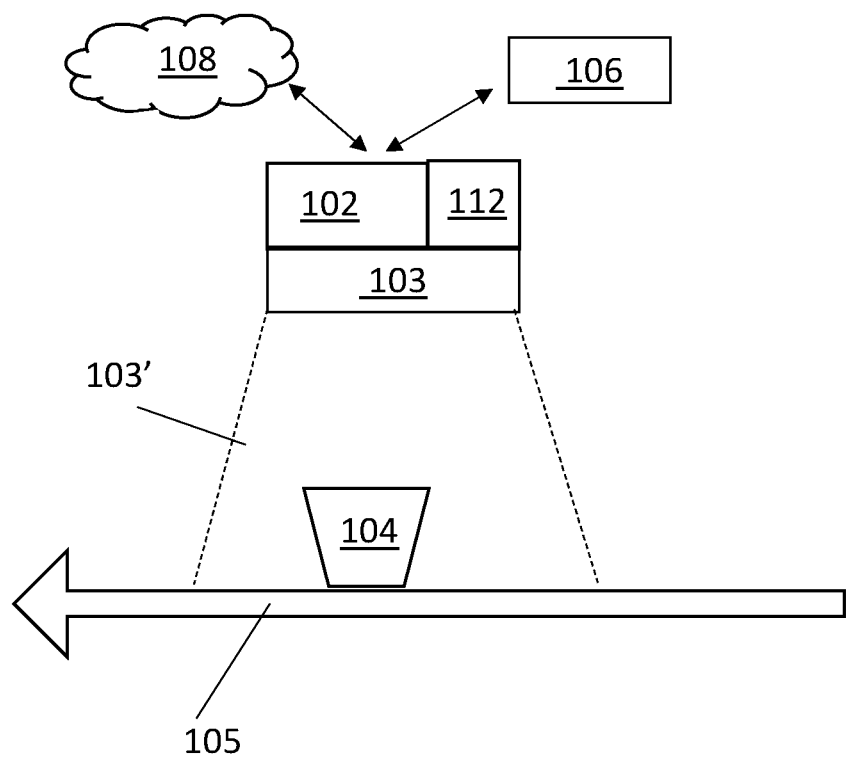
FIG. 1 schematically illustrates a system, operable according to embodiments of the invention.

Embodiments of the invention provide visualization of a minimal detectable defect size and options of changing the minimal detectable defect size based on input from a user, to accommodate specific needs.

The minimal detectable defect size of a defect may affect the inspection process and the inspection results. Namely, if the minimal detectable size of a defect is too high some defects may not be detected, thereby reducing the accuracy and reliability of the inspection results. However, if the minimal size of detection is too low, artifacts may be detected as defects and may introduce unnecessary noise to the inspection process, causing wasted time and increased frustration for the user and also reducing the reliability of the inspection results. Therefore, providing options of changing the minimal detectable size and visually demonstrating the minimal detectable size to a user saves time and frustration from the user and increases the reliability of the inspection results.

The term 'defect' may include, for example, a visible flaw on the surface of an item, an undesirable size, shape or color of the item or of parts of the item, an undesirable number of parts of the item, a wrong or missing assembly of the item or its interfaces, a broken or burned part, an incorrect alignment of an item or parts of an item, a wrong or defected barcode, and in general, any difference between a defect free sample and the inspected item, which would be evident from the images to a user, namely, a human inspector in the production line. In some embodiments, a defect may include flaws which are visible only in enlarged or high resolution images, e.g., images obtained by microscopes or other specialized cameras. In some embodiments, a defect may include flaws which are visible only in images obtained in frequencies outside visible light, e.g., images obtained by ultra-violet, near-infra-red, infra-red specialized cameras, or images obtained using non-optical means, e.g., images obtained by neutron cameras, RADAR or the like.

Inspection processes, according to embodiments of the invention, typically include a set up stage prior to an inspection stage.

In the set up stage, a processor learns parameters of images of items, for example, imaging parameters (e.g., exposure time, focus and illumination), spatial properties and uniquely representing features of an item in images. These parameters may be learned, for example, by analyzing images of items using different imaging parameters and by analyzing the relation between different images of a same type of item. This analysis, using different imaging parameters and comparing several images of items during the set up stage, enables to discriminatively detect a same type of item (either defect-free or with a defect) in a new image (e.g., a new image obtained in the inspection stage following the set up stage), regardless of the imaging environment of the new image.

In embodiments of the invention, the minimal detectable defect size can be adjusted during the set up stage of an inspection process to enable accurate inspection results during the following inspection stage.

The term "same-type items" or the like, refers to items or objects which are of the same physical makeup and are similar to each other in shape and dimensions and possibly color and other physical features. Typically, items of a single production series, batch of same-type items or batch of items in the same stage in its production line, may be "same-type items". For example, if the inspected items are sanitary products, different sink bowls of the same batch are same-type items. Same type items may differ from each other within permitted tolerances.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "learning" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

An exemplary autonomous machine vision system, which may be used for image-based inspection processes according to embodiments of the invention, is schematically illustrated in FIG. 1.

In one embodiment, the system includes a processor 102 in communication with one or more camera(s) 103 and with a device, such as a user interface device 106 and/or other devices, such as storage device 108.

Components of the system may be in wired or wireless communication and may include suitable ports and/or network hubs. In some embodiments processor 102 may communicate with a device, such as storage device 108 and/or user interface device 106 via a controller, such as a programmable logic controller (PLC), typically used in manufacturing processes, e.g., for data handling, storage, processing power, and communication capabilities. A controller may be in communication with processor 102, storage device 108, user interface device 106 and/or other components of the system, via USB, Ethernet, appropriate cabling, etc.

Processor 102 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 102 may be locally embedded or remote.

The user interface device 106 may include a display, such as a monitor or screen, having a graphic user interface (GUI) for displaying images, instructions and/or notifications to a user (e.g., via text or other content displayed on the monitor). User interface device 106 may also be designed to receive input from a user. For example, user interface device 106 may include a monitor and keyboard and/or mouse and/or touch screen, to enable a user to input feedback, instructions, a desired minimal detectable defect size, and more.

Storage device 108 may be a server including for example, volatile and/or non-volatile storage media, such as a hard disk drive (HDD) or solid-state drive (SSD). Storage device 108 may be connected locally or remotely, e.g., in the cloud. In some embodiments, storage device 108 may include software to receive and manage image data and to maintain information relating to image resolution and detectable defect sizes. For example, databases and look-up-tables depicting the relationship between image resolutions and/or camera distances (e.g., distance of the lens of the camera) from an item to minimal detectable defect sizes, may be maintained and managed in storage device 108. Additionally, information regarding actually detected defects (typically detected during an inspection stage), such as sizes and/or locations of detected defects, may be stored in storage device 108.

Camera(s) 103, which are configured to obtain an image of an inspection line 105, are typically placed and fixed in relation to the inspection line 105 (which may include, e.g., a conveyer belt), such that items (e.g., item 104) placed on the inspection line 105 are within the FOV (field of view) 103' of the camera 103.

Camera 103 may include a CCD or CMOS or other appropriate image sensor. The camera 103 may be a 2D or 3D camera. In some embodiments, the camera 103 may include a standard camera provided, for example, with mobile devices such as smart-phones or tablets. In other embodiments, the camera 103 is a specialized camera, e.g., a camera for obtaining high resolution images. In other embodiments, camera 103 is a specialized camera, e.g., an ultra-violet, near-infra-red or infra-red specialized camera. In other embodiments camera 103 includes a non-optical camera, such as a neutron camera, a RADAR camera and the like.

In some embodiments, the system includes a distance sensor, such as a dedicated range sensor (e.g., using laser, IR or other appropriate methods for measuring distance), to obtain a measurement of distance of the camera 103 from the item 104.

The system may also include a light source, such as an LED or other appropriate light source, to illuminate the camera FOV 103', e.g., to illuminate item 104 on the inspection line 105.

Processor 102 receives image data (which may include data such as pixel values that represent the intensity of reflected light as well as partial or full images or videos) of items on the inspection line 105 from the one or more camera(s) 103 and runs processes according to embodiments of the invention.

In some embodiments, the processor 102 may determine a distance of the camera 103, typically of a lens of the camera, from the item 104, and determine the minimal detectable defect size based on the distance of the camera from the item.

Determining the distance of the camera from the item may be done, for example, by using a distance sensor, or based on a calculated position of the camera when focuses on the item, or based on user input, or based on the image of the item.

For example, known neural networks that estimate 3D information from 2D images, can be used. The system may include a 3D image sensor adjacent to camera 103, which may be a 2D image sensor. Processor 102 may align results of the 3D sensor with an image obtained from camera 103. For example, instructions to a user may be displayed, via user interface device 106, to move item 104 to a fixed and defined location in the space from which a depth reconstruction can be performed using stereo based methods which triangulate each pixel between the image obtained from the 3D sensor, the image obtained from camera 103 and the camera 103 itself, to estimate the distance of item 104 from the camera 103. Alternatively, the location/orientation of camera 103 may be changed (either by a user, based on displayed instructions, or automatically based on a signal from processor 102) to obtain an image that aligns with the image obtained from the 3D sensor, as described above.

In some embodiments, processor 102 may calculate a minimal detectable defect size for an item 104 based on an optimal focus setting of the camera 103 obtained for the item 104. In some embodiments, if item 104 includes, for example, different areas (e.g., different surfaces) with different heights or different focus settings of camera 103, this process may be iterative. An optimal focus setting of camera 103 may be obtained for each different area (e.g., surface) of item 104 and a minimal detectable defect size can be calculated and demonstrated to a user, for each different area of item 104. Thus, for each camera, using the zoom level and the focus setting, it is possible to directly calculate a distance of the camera from the item or from an area of the item. Alternatively or in addition, the processor 102 may obtain the distance of the camera from the item (or area of the item), from a distance sensor and/or request an input from the user of the system, regarding the distance of the camera from the item.

Using the distance of the item from the camera, the system can use a database or look-up-table, showing the probable minimal detectable defect size for the determined distance of camera, and so determine a value of the minimal detectable defect size. The minimal detectable defect size can be measured in absolute measurements units e.g., millimeters, or in the number of pixels on the image sensor of the camera, or in other units.

The minimal detectable defect size may be an average or other statistical calculation of data. In some embodiments the data may include, for example, previously calculated sizes. In other embodiments the data may be obtained, e.g., based on typical industry produced items tested in labs or in production lines for the minimal detectable defect size and stored for future usage.

Processor 102 is typically in communication with a memory unit 112. Memory unit 112 may store at least part of the image data received from camera(s) 103.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In some embodiments the memory unit 112 stores executable instructions that, when executed by processor 102, facilitate performance of operations of processor 102, as described herein.

In one embodiment, an image of an item on an inspection line is displayed on user interface device 106. The image may be displayed using the specific set up aspects (e.g., zoom/focus) set for camera 103 before obtaining the image). User interface device 106 may also include a GUI having buttons and icons to enable a user to input a desired sensitivity level, namely, to determine how sensitive the system will be, to detect different sizes of defects.

Processor 102 receives, possibly from a user, a sensitivity level relating to the displayed image and calculates a minimal defect size visible in the image at the received sensitivity level. Processor 102 then causes the minimal defect size to be displayed, via the user interface device 106.

The sensitivity level received at processor 102 may include parameters such as camera lens distance from the item and camera zoom level.

Figure 2:
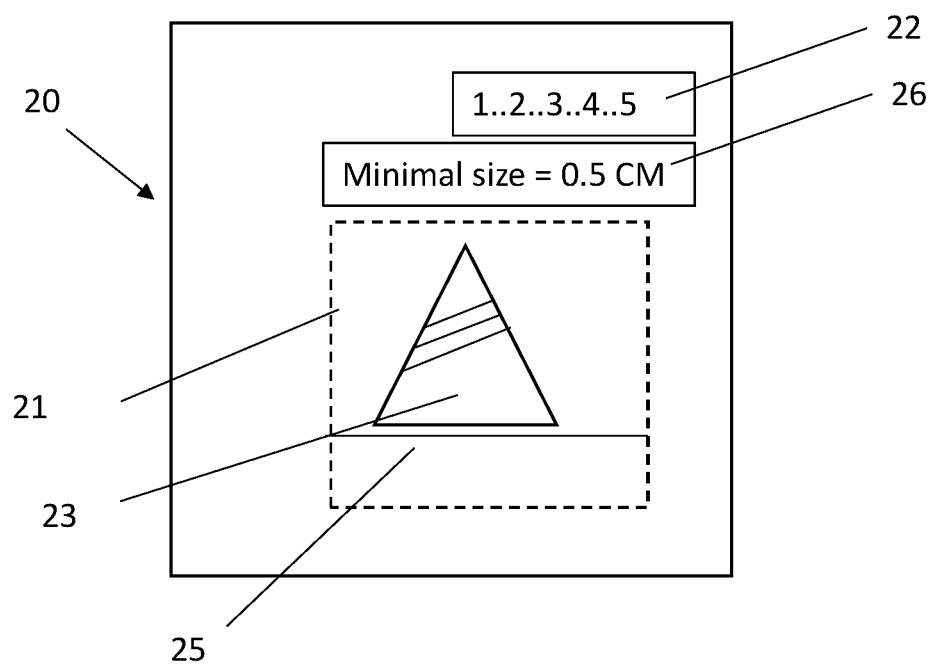
FIG. 2 schematically illustrates a user interface device display according to an embodiment of the invention.

An example of a user interface device display according to embodiments of the invention, is schematically illustrated in FIG. 2. A display 20 of a visual inspection system, includes a GUI useful for set up of a visual inspection process and for the inspection stage of the visual inspection process. The GUI displays an image 21 of an item 23 on an inspection line 25. The GUI further includes a sensitivity bar 22 operable by a user, by which the user inputs a desired sensitivity level.

The sensitivity bar 22 typically includes a graphical element, e.g., a shape, such as a circle or rectangle, having markings, such as numbers or scale marks, to enable a user to select a desired sensitivity level. Typically, operation of sensitivity bar 22 by a user changes resolution of the display 20. The display resolution may be changed by electronically changing the area of the image sensor presented upon the display 20 ('digital zoom') and/or by controlling the camera, by which image 21 was obtained, to alter the tangent portion of the real field of view that is optically reflected upon the image sensor of the camera, thus causing the image to reflect smaller absolute areas imaged by the camera ('optical zoom'). A similar effect can be achieved by shortening the physical distance between the item and the sensor ('physical zoom').

For example, the image output from the camera 103 sensor may be a 20 Mega pixels image, and the image on which processor 102 runs detection algorithms and which is visible to the user is a 5 Mega pixels image. If the 5 Mega pixels image is a resized version of the full 20 Mega pixels image, then no digital zoom is in effect. If the 5 Mega pixels image is a resized version of a 10 Mega pixels sub-image which is part of the original 20 Mega pixels image, then a digital zoom effect is achieved for the sub-image. If the 5 Mega pixels image is a copied version of a 5 Mega pixels sub-image of the original 20 Mega pixels image, then the maximal digital zoom possible in this optical setup is in effect. Other methods to achieve digital zoom can include using image-processing interpolation methods or neural network interpolation methods on the sub-image or on a group of sub images of the area the user wishes to zoom into.

For example, the image output from the camera 103 sensor may be a 20 Mega pixels image, upon which a 100 degree field of view is reflected without applying any optical zoom. As the tangent of the field of view is altered optically, e.g., from a 100 degrees field of view to a 50 degrees field of view, the area of the image sensor will reflect half the absolute area upon the same 20 Mega pixels image sensor, hence doubling the optical zoom. A similar effect can be achieved by halving the physical distance between camera 103 and the item thus doubling the physical zoom.

As described above, a processor that is in communication with a user interface device having display 20, receives a sensitivity level input from a user, e.g., via operation of sensitivity bar 22. The processor calculates a minimal defect size visible in image 21 at the sensitivity level input via the sensitivity bar 22. The minimal defect size 26 can then be displayed on display 20. Thus, a user may easily adjust the minimal detectable defect size by operating a graphical element on a display, without having to relate to camera optical parameters, the geometry of the inspection system and the internal algorithms detection capabilities of the system.

Figure 3A:
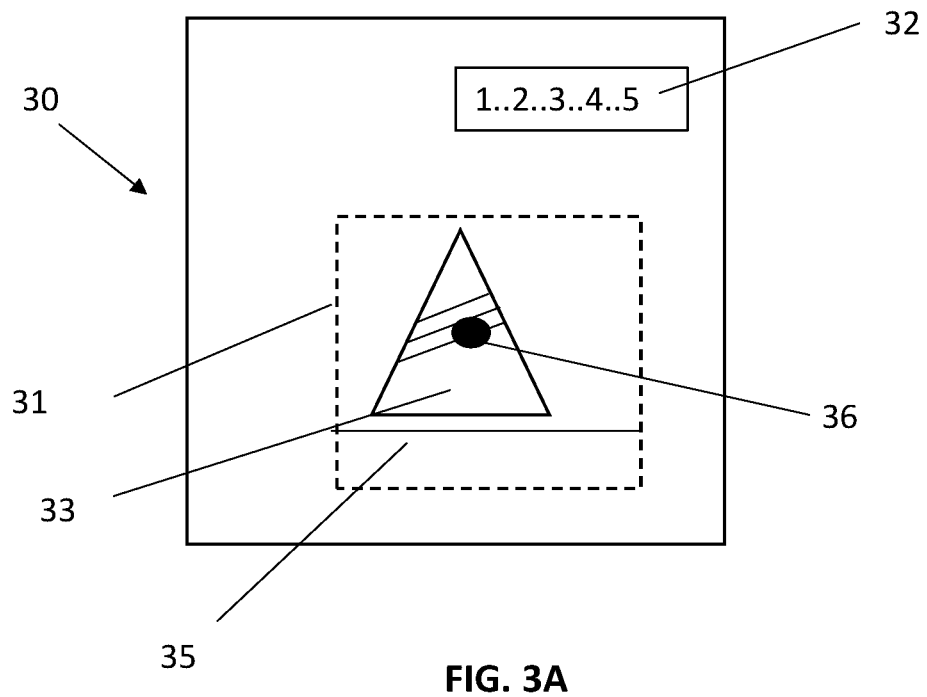
FIGS. 3A, 3B and 3C schematically illustrate a user interface device displaying a graphical element to demonstrate the minimal detectable defect size, according to embodiments of the invention.
Figure 3B:
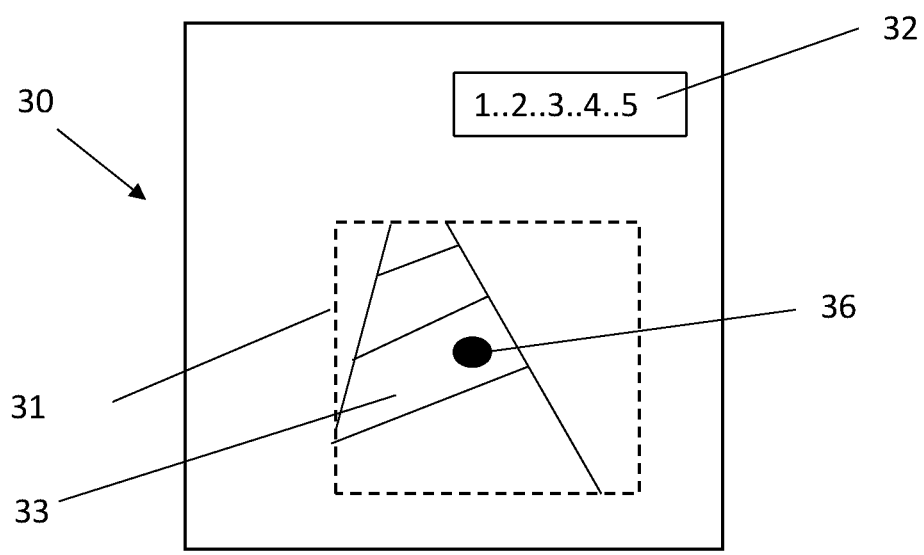

The minimal defect size 26 can be displayed as a numerical value (as exemplified in FIG. 2), e.g., metric value or other size value and/or as a graphical element superimposed on the image 21 (as exemplified in FIGS. 3A and 3B).

A metric value can be calculated based on the distance of the camera from the item, from which the iFOV (instantaneous field of view) can be constructed. The size of each image pixel in real world metrics can be calculated using the iFOV. Once the zoom of the camera and the distance of the camera from the item are known, and a sensitivity level is input, processor 102 can calculate how many pixels are needed for defect detection and may times the number of pixels by each pixel size to obtain the metrics size of the expected minimal detectable defect.

Thus, in one embodiment, a processor calculates a real-world metric of a minimal defect size and displays to a user a numerical value of the calculated metric on a user interface device FIG. 3A schematically illustrates a display 30 which includes a GUI displaying an image 31 of an item 33 on an inspection line 35 on which the minimal defect size is displayed as a superimposed graphical element 36. In FIGS. 3A and 3B the graphical element 36 includes a circle, however, any other graphical element can be used, such as other geometric shapes, a grid or other graphics that can serve to visibly demonstrate on display 30 the change in detectable defect size according to change of sensitivity level, as changed by user input, e.g., by operation of the sensitivity bar 32.

In some embodiments, as schematically illustrated in FIG. 3B, based on the sensitivity level, as input by a user, e.g., by operation of sensitivity bar 32, a processor changes zoom of the image 31 but not of the graphical element 36. In FIG. 3B, due to the change of zoom, image 31 seems to be zoomed-in and a smaller part of item 33 is visible. In relation to the zoomed-in image the size of the graphical element 36 does not change, demonstrating to the user that even small defects on item 33 will be detected at this sensitivity level. In this case, graphical element 36 serves as a standard by which a user can understand the implication of the requested sensitivity level on the minimal detectable defect size.

Figure 3C:
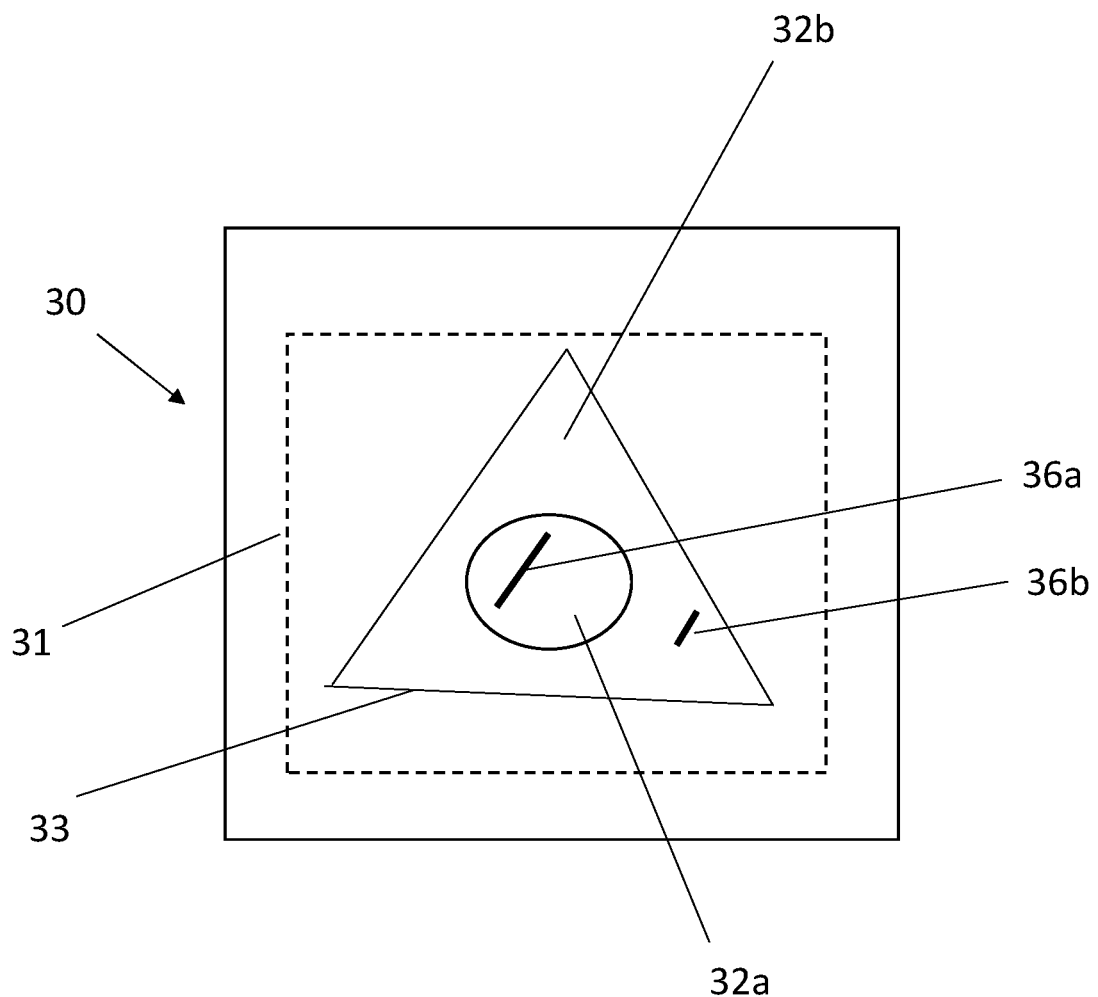

In another example, which is schematically illustrated in FIG. 3C, a display 30 includes a GUI displaying an image 31 of an item 33 on an inspection line 35. Item 33 includes several areas 32a and 32b, which are at different heights and therefor at different distances from the camera. Each area has a different optimal focus and a different minimal detectable defect size. Thus, a processor can calculate the minimal defect size based on distance of the camera from an area on the item, when the area is in focus. As detailed below, the area can be determined automatically or determined by a user.

In this example, each minimal detectable defect size is displayed as a graphical element possibly together with a metric value of the minimal size (which can be calculated as described above). Each graphical element 36a and 36b is superimposed on an area in the image which correlates with a different area of the item 33. The graphical elements 36a and 36b may be differently sized to demonstrate to a user the differences in minimal detectable size in each of the different areas 32a and 32b.

In some embodiments, a processor, such as processor 102, calculates a statistic of actual defect sizes (as opposed to the minimal detectable defect sizes, which relate to theoretical defects) based on defects detected in a plurality of images of same type items, such as items 104. The plurality of images, from which actual defect sizes are detected, are typically images obtained during an inspection stage (as opposed to the minimal detectable defect sizes that are calculated in the set up stage, prior to the inspection stage). The processor may cause the calculated statistic to be displayed on a user interface, such as the GUI of display 30. For example, a histogram (or other graphical display) showing the number of actual defects in different sizes, may be displayed to a user.

In some embodiments, a processor, such as processor 102, may create a heat map of locations of detected defects on the item, such as item 104. The heat map typically highlights locations on the item where defects were detected, coloring the highlighted locations according to the number of defects found at each location. The processor may display the heat map superimposed on an image of the item, on a user interface, such as the GUI of display 30, showing the different locations of the item colored by the colors of the heat map, according to the number of defects detected in each location.

The graphic display of the statistic of actual defect sizes and/or of the heatmap of locations of detected defects are visual aids that assist the user in understanding the distribution of defects in a certain item (e.g., how many of the defects detected throughout a plurality of images are of a certain size, where are most of the defects located on the item, etc.).

Embodiments of the invention may include a user interface which includes a sensitivity bar 32 and/or graphic display of the statistic of actual defect sizes and/or of the heatmap of locations of detected defects and/or other graphical elements described herein.

Figure 4A:
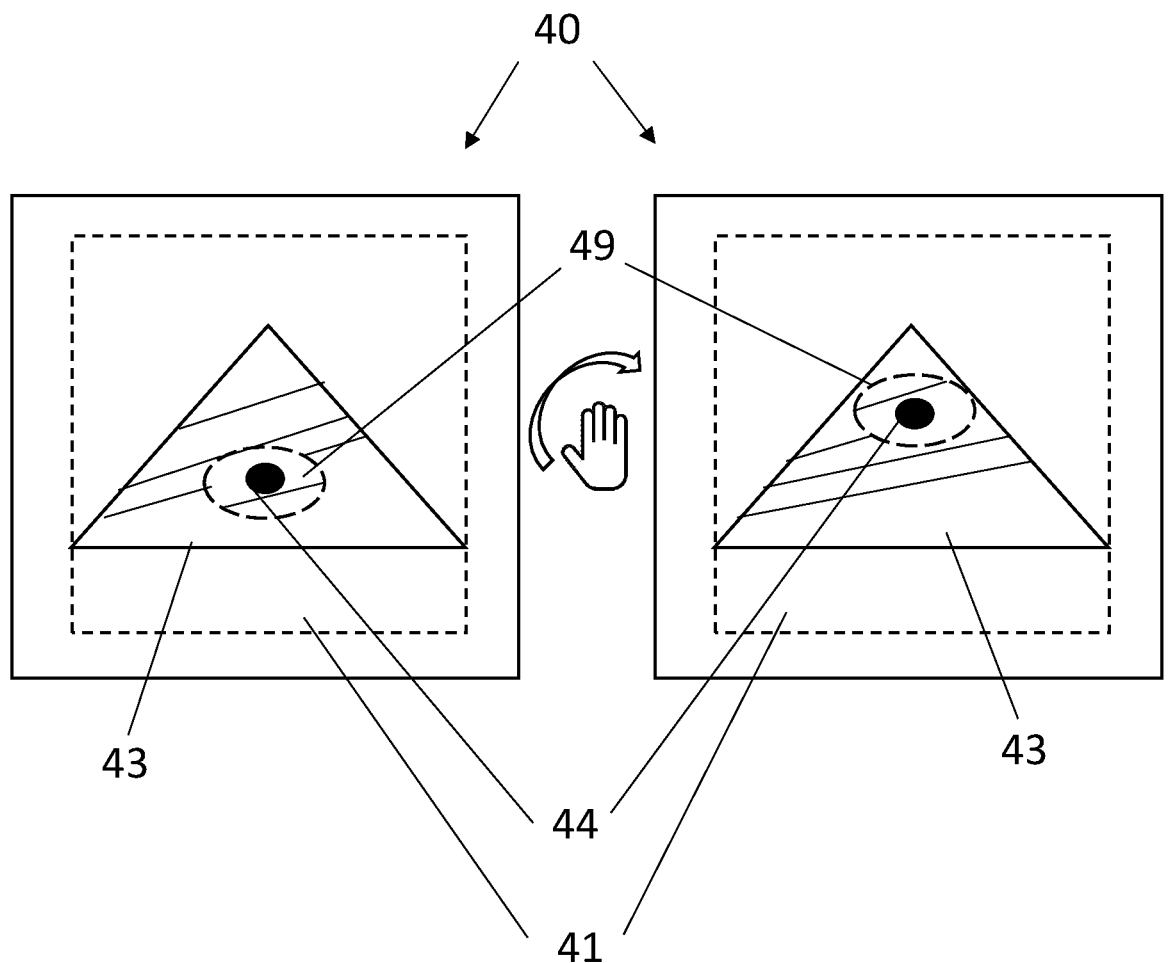
FIGS. 4A and 4B schematically illustrate a user interface device display including a moveable and possibly adjustable icon, according to an embodiment of the invention.

In display 40, which is schematically illustrated in FIG. 4A, a GUI displays an image 41 of an item 43, typically during a set-up stage of an inspection process. The GUI also includes a graphical element, such as icon 44, which is moveable by a user (e.g., via a "click and drag" operation, as demonstrated by the illustration of hand and arrow) to locations on the display 40. In some embodiments, a changed zoom of the image 41, (e.g., as changed by input of a desired sensitivity level by a user), is visible to the user only in an area 49 at the location of the icon 44 (e.g., in vicinity of icon 44) on the display 40. A processor can then calculate the minimal detectable defect size in the area 49 in vicinity of the icon 44.

In other embodiments the digital zoom of the image on display 40 is changed at one or more pre-determined locations, e.g., at a center area of the image or in an area surrounding the mouse cursor on the image.

The icon 44 may be initially displayed at a pre-determined, default, location in the image 41, e.g., in the center of the image. A processor will change zoom of the display in vicinity of the icon, based on an input sensitivity level. If the user moves the icon from the default location, the zoom of the display at the default location will revert to the initial zoom of the image but at locations in vicinity of the moved icon, the processor will change the displayed zoom to visually demonstrate to the user the size of the defect that can be detected at that location, given a specific sensitivity level.

Figure 4B:
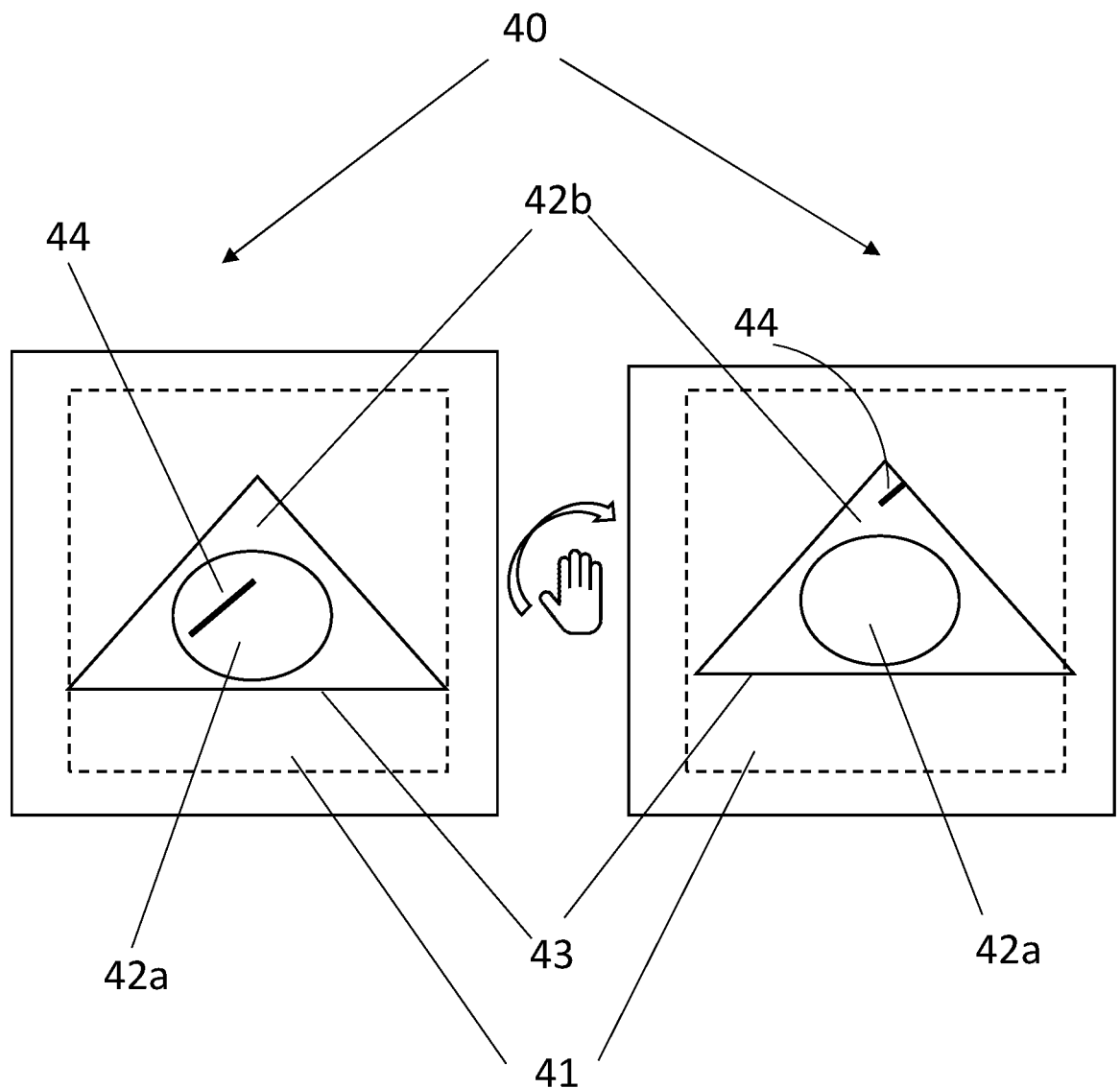

In another embodiment, which is schematically illustrated in FIG. 4B, a GUI displays on display 40 an image 41 of an item 43 having different areas 42a and 42b, each area having a different optimal focus. Icon 44, which may be moved to different locations on the display 40, is an adjustable graphical element that can change its visual appearance, (such as, its size or shape or color) based upon its location on the display 40 and/or based on its location relative to item 43 in the image. Thus, a graphical element, such as icon 44, can have a changed visual appearance based on its location on a displayed image.

Icon 44 may be initially located in area 42a, where the size (or other visual aspect) of the icon 44 demonstrates the minimal detectable defect size in area 42a. A user may then move icon 44 (as demonstrated by the illustration of hand and arrow) to area 42b, where the zoom of the image may change (as described above) and/or the size (or other visual aspect) of the icon 44 may change to demonstrate the minimal detectable defect size in area 42b.

In some cases, item 43 may be out of focus of the camera (e.g., if item 43 is relatively small or located outside the focus of the camera). Icon 44 may then be moved by the user to the location of the item in the image to indicate that optimal focus should be directed to this location.

These embodiments enable easy adjustment of focus at a user-determined location in the image.

In some embodiments, icon 44, when located on image 41 may fade away or become more transparent after a pre-defined period of time, or based on user request, so as not to obscure image 41.

In some embodiments a static icon may be made moveable and/or adjustable as described above, based on user input. For example, a typical number of clicks on the icon or pressing a dedicated button, may turn the icon from static to moveable and/or adjustable.

Figure 5A:
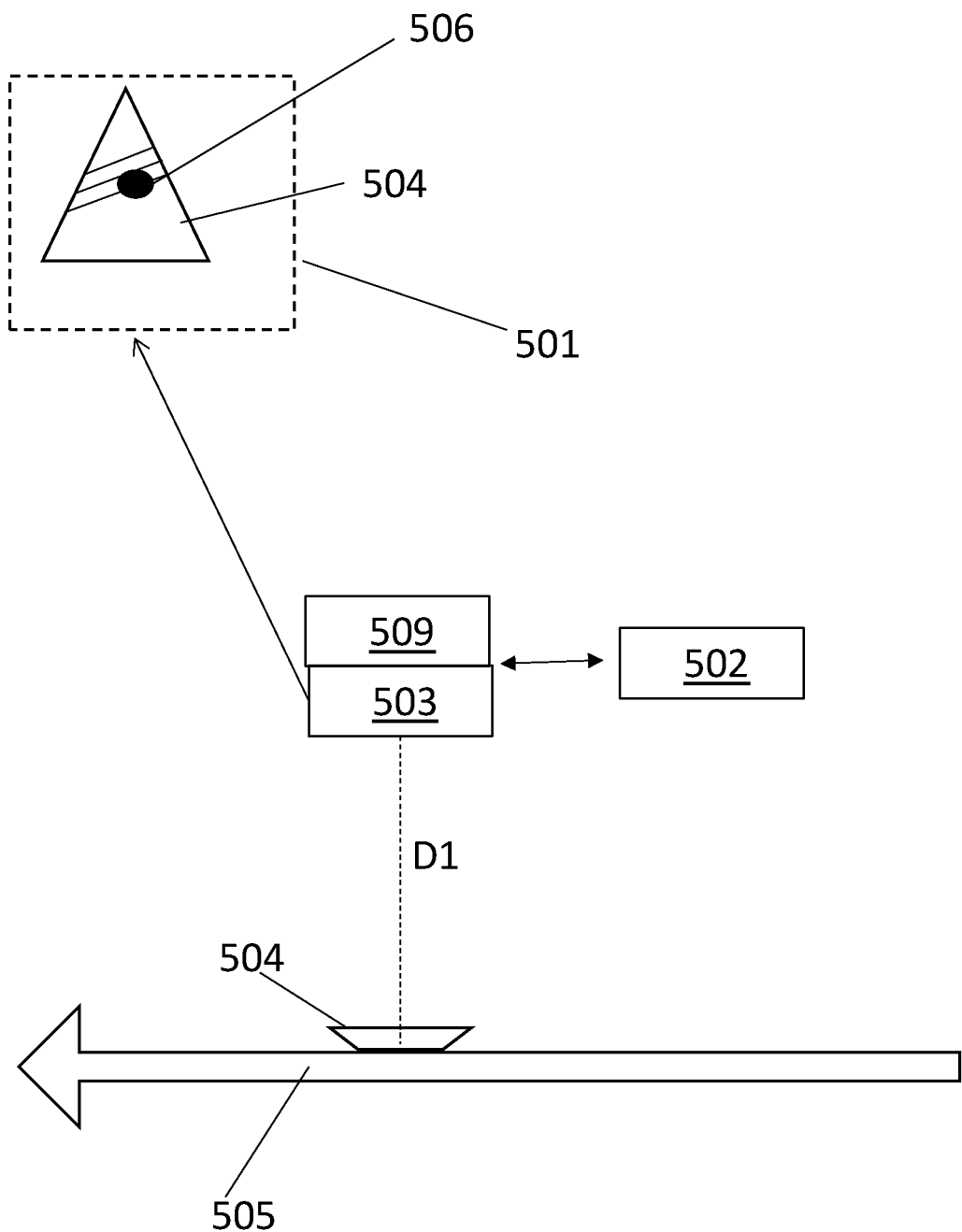
FIGS. 5A and 5B schematically illustrate systems according to another embodiment of the invention.
Figure 5B:
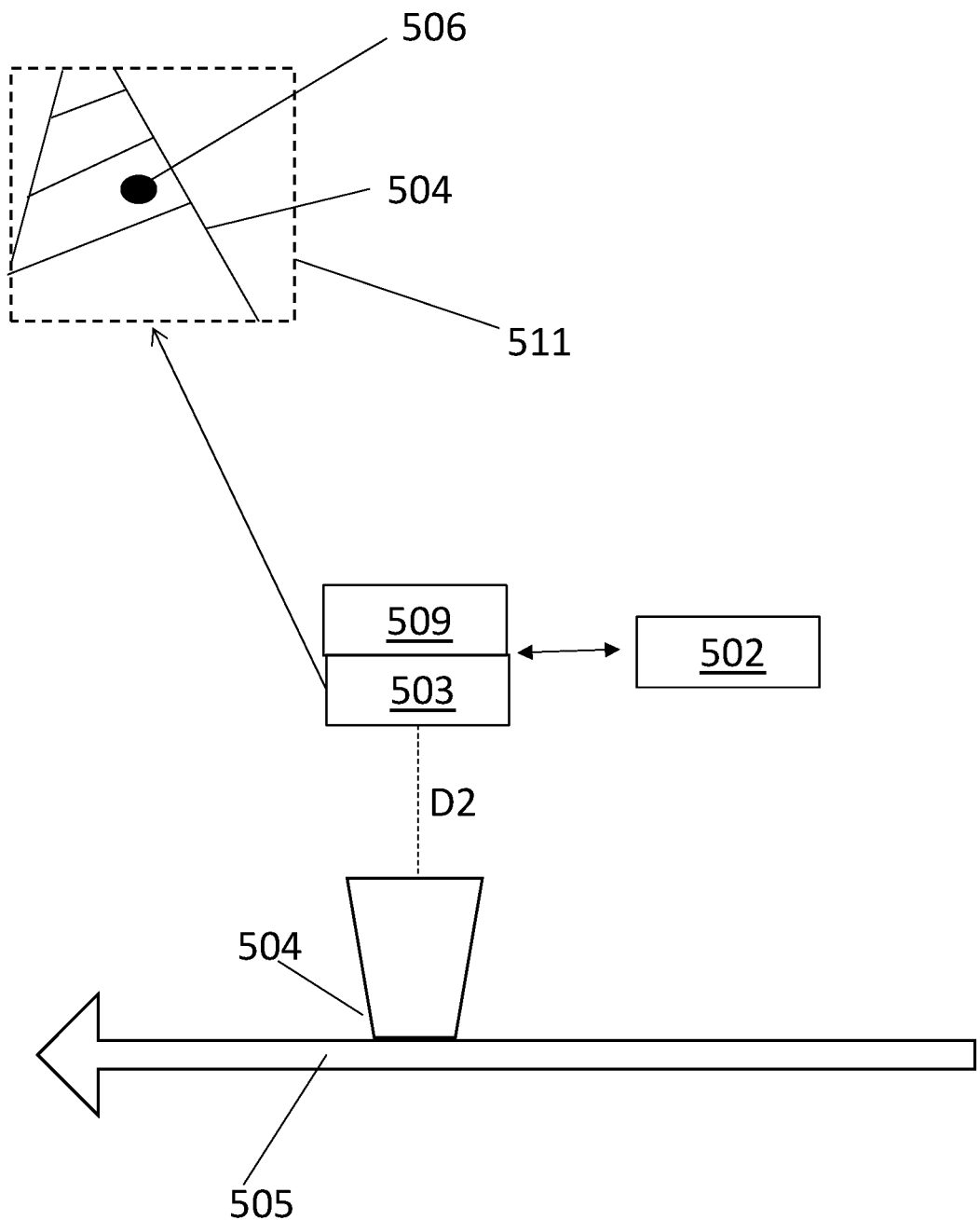

In some embodiments, which are schematically illustrated in FIGS. 5A and 5B, a processor 502 that is in communication with camera 503, calculates the minimal detectable defect size based on distance of the camera 503 (typically, the camera lens) from the item 504 on an inspection line 505, when the image of item 504 is in focus. The distance of the camera 503 from the item 504 can be calculated based on the image (as described above), or may be input by a user. In other embodiments, the distance can be obtained from a distance sensor 509.

In some embodiments item 504 includes different areas at different distances from camera 503 and at different focuses. Processor 502 can calculate the minimal defect size based on distance of the camera from each area on the item 504, when the area is in focus. In some embodiments processor 502 calculates the minimal defect size for a pre-determined area. In other embodiments processor 502 calculates the minimal defect size for an area specified by a user, e.g., by bringing a moveable icon to the area on an image on a display, as described above.

The distance D1 of the camera 503 from item 504 in FIG. 5A is greater than the distance D2 of the camera 503 from item 504 in FIG. 5B. Therefore, the image 501 captured at distance D1 captures a larger area of item 504 than image 511, which is captured at distance D2. Also, graphical elements 506 (which may be as described above) will be of different proportions relative to item 504 in image 501 and 511, demonstrating how the distance of the camera from the item effects the minimal detectable defect size.

Figure 6:
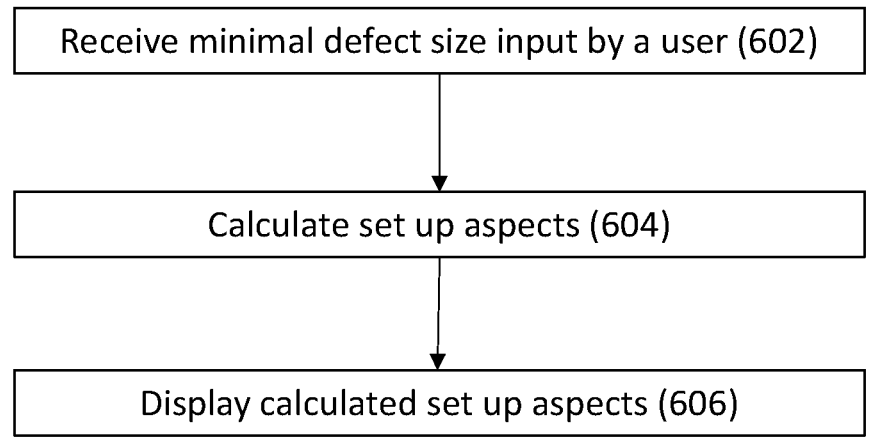
FIG. 6 schematically illustrates a method for visual inspection, according to embodiments of the invention.

Embodiments of the invention provide a system for visual inspection which includes a processor in communication with a user interface device and a camera that is configured to capture an image of an item on an inspection line. A method carried out by the processor, which is schematically illustrated in FIG. 6, includes receiving a desired minimal defect size input from a user (602), e.g., via a GUI on the user interface device. The processor may then calculate the actual, real-world, pixel size and number of pixels required for the desired size input by the user. The processor may calculate set up aspects, such as distance from the camera and zoom level, required to enable detecting and displaying the calculated number of pixels (604). The calculated set up aspects may then be displayed to the user (606). Additionally, an indication of the area of the item covered by the camera FOV at the calculated distance and/or zoom, may be displayed to the user. The area covered by the camera FOV may be displayed in measurement units and/or may be visually apparent from displayed images of the item, such as images 501 and 511.

In some embodiments, the processor may control movement of the camera and/or zoom of the camera to conform with the calculated set up aspects and to obtain images of inspected items at the calculated distance and/or zoom.

The embodiments described above cause operation of a visual inspection system to be more item based than system operation based, thereby providing a user experience of autonomous visual inspection, in which the system delivers to the user an indication of the expected minimal detectable defects, without the user having or needing knowledge of the camera optical parameters, the geometry of the inspection system and the internal algorithms detection capabilities.

The invention claimed is:

1. A system for visual inspection, the system comprising a processor in communication with a user interface device, the processor to:
   receive a sensitivity level relating to an image of an item on an inspection line, the image being displayed on the user interface device;

calculate a minimal detectable defect size visible in the image at the received sensitivity level;

cause the calculated minimal detectable defect size to be displayed on the user interface, wherein the processor is in communication with a camera configured to capture the image of the item on the inspection line, the processor configured to calculate the minimal detectable defect size based on distance of a lens of the camera from the item, when the item is in focus.

2. The system of claim 1 wherein the processor is configured to:

calculate a real-world metric of the minimal detectable defect size; and display a numerical value of the calculated metric on the user interface device.

3. The system of claim 1 wherein the minimal detectable defect size is displayed as a graphical element superimposed on the image displayed on the user interface device.

4. The system of claim 3 wherein the graphical element comprises an icon moveable by a user.

5. The system of claim 3 wherein the processor is configured to, based on the sensitivity level, change a zoom of the display but not of the graphical element.

6. The system of claim 3 wherein the graphical element has a changed visual appearance based on location of the graphical element on the image.

7. The system of claim 1 wherein the distance is input by a user.

8. The system of claim 1 wherein the distance is obtained by a distance sensor.

9. The system of claim 1 wherein the processor is in communication with a camera configured to capture an image of the item on the inspection line, and wherein the processor is configured to calculate the minimal detectable defect size based on a distance of a lens of the camera from an area on the item, when the area is in focus.

10. The system of claim 9 wherein the area is at a user-determined location in the image.

11. The system of claim 10 wherein the user interface displays an icon moveable by the user, wherein the area is in vicinity of the icon.

12. The system of claim 11 wherein the processor is configured to change a zoom of the display in vicinity of the icon.

13. The system of claim 1 wherein the user interface device displays a sensitivity bar, operable by a user, by which the user inputs the sensitivity level.

14. The system of claim 1 wherein the processor is configured to:

calculate a statistic of actual defect sizes based on defects detected in a plurality of images of same type items; and cause the calculated statistic to be displayed on the user interface.

15. The system of claim 14 wherein the processor is configured to create a heat map of locations of detected defects on the item: and display the heat map superimposed on an image of the item, on the user interface.

16. A GUI for a visual inspection system, the GUI displaying an image of an item on an inspection line and comprising:

a sensitivity bar controllable by a user, to change a resolution of the image; the GUI being controlled by a processor that calculates a minimal detectable defect size based on the changed resolution and causes display of the calculated minimal detectable defect size on the GUI.

17. The GUI of claim 16 wherein the processor calculates a real-world metric of the minimal detectable defect size and causes display of a numerical value of the calculated metric on the GUI.

18. The GUI of claim 16 comprising an icon moveable by the user to a location on the image, wherein the resolution of the image is visible to the user at the location on the image in vicinity of the icon.

19. The GUI of claim 16 comprising a display of statistics of actual defect sizes calculated based on defects detected in a plurality of images of same type items.

20. The GUI of claim 16 comprising a heat map of locations of detected defects on the item, the heat map superimposed on an image of the item.

* * * * *